Patented Dec. 1, 1936

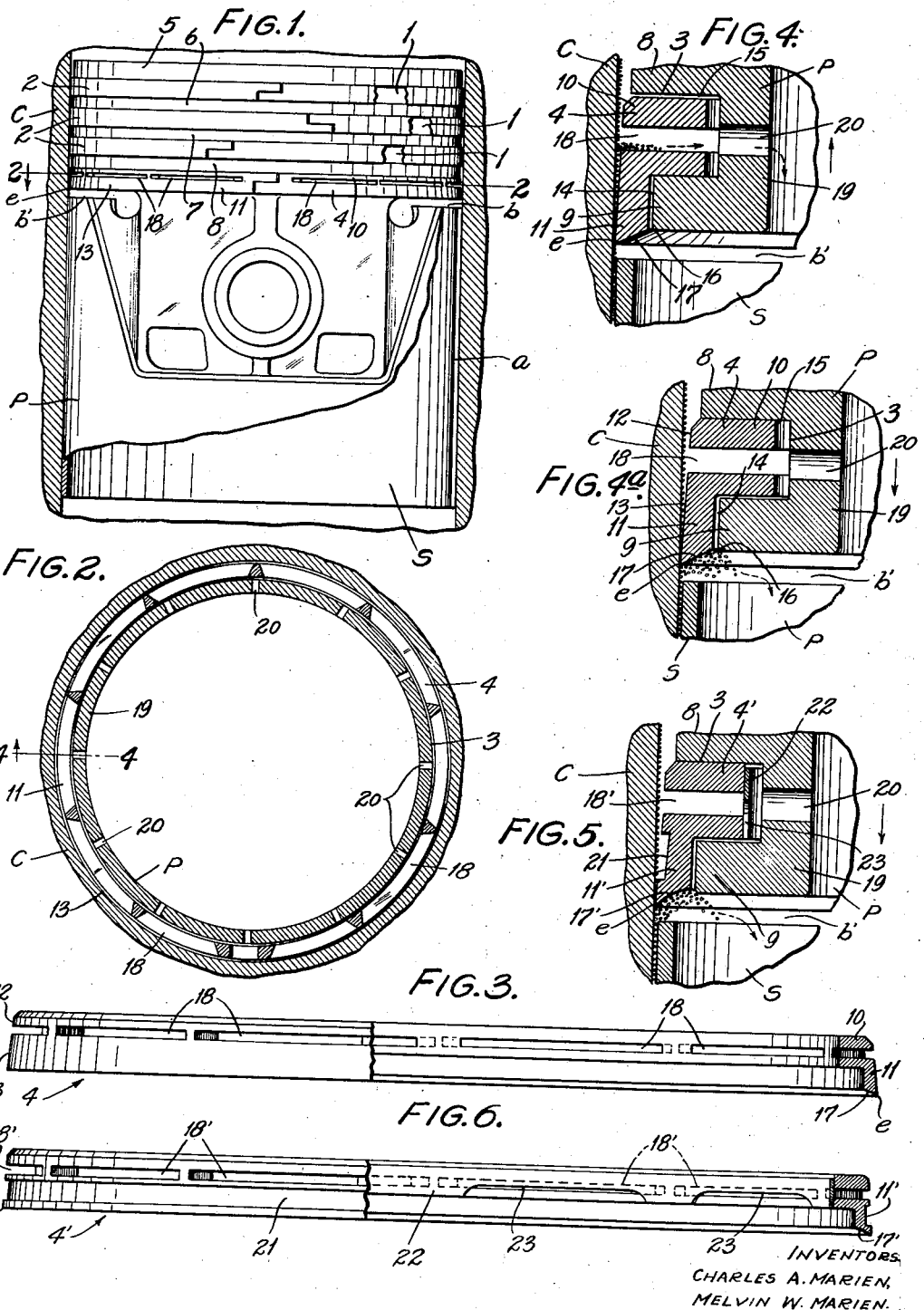

2,062,367

UNITED STATES PATENT OFFICE 2,062,367

PISTON RING

Charles A. Marien and Melvin W. Marien, St. Louis, Mo., assignors to Ramsey Accessories Manufacturing Corporation, St. Louis, Mo., a corporation of Missouri Application December 3, 1934, Serial No. 755,656

2 Claims. (Cl. 309—45)

Our invention has relation to improvements in piston rings for internal combustion engines, and it consists in the novel features of construction more fully set forth in the specification and pointed out in the claims.

The principal object of the present invention is to provide a piston ring for internal combustion engines that will effect oil control. We are well aware that there are many so-called oil rings on the market, the function of which is to prevent oil leakage. Most of these rings are effective under certain conditions and for short periods of time. However, none are entirely satisfactory in that they do not effect oil control to the extent desirable for the best operation of the engine with the greatest economy. This is true because the quantities of oil that surge against the lower oil ring cannot be completely drained through the ring, and much of the oil is forced past the ring on the down stroke of the piston. Furthermore, pressure is exerted by the accumulated oil which often unseats the ring and allows oil to flow past it.

We have provided an oil ring that disposes of most of the excess oil before it has an opportunity to get past the lower edge of the ring face. We accomplish this object by embodying in our improved ring a downwardly extending flange having a shearing edge in the immediate vicinity of the horizontal slots at the top of the piston skirt. The manner of accomplishing this object, as well as other advantages inherent in the invention, will be better apparent from a detailed description of the invention in connection with the accompanying drawing, in which:

Figure 1 is a side elevation of a piston within an engine cylinder shown in section, said piston being equipped with our improved oil control ring; Fig. 2 is a horizontal cross-section taken on the line 2—2 of Fig. 1; Fig. 3 is a combined side elevation and cross-section of our improved ring somewhat enlarged; Fig. 4 is a further enlarged cross-section through our improved ring and parts of the cylinder and piston adjacent thereto, said section being taken on a plane indicated by the line 4—4 of Fig. 2; Fig. 4a is a section similar to the section shown in Fig. 4, except that the piston ring has been shifted to the opposite side of the groove which occurs on the down stroke of the piston; Fig. 5 is a section similar to that shown in Fig. 4a showing a modified form of an oil control ring and an inner ring behind the oil control ring; and Fig. 6 is a combined side elevation and cross-section of the modified form of oil control ring shown in section in Fig. 5.

Referring to the drawing, C represents an engine cylinder in which a piston P operates, said piston being of the type having a slotted skirt S. In the form of piston illustrated, there is a longitudinally disposed slot $a$ and oppositely disposed horizontal slots $b$, $b'$, the former of which is in communication with the longitudinal slot $a$. This type of piston is well known in the art, and the slots $b$, $b'$ are primarily for preventing excess heat conduction to the skirt and incidentally for the purpose of draining excess oil accumulations below the piston ring lands.

The upper part of the piston is provided with a plurality of ring grooves 1, 1, 1 in which are usually disposed the ordinary type of compression rings 2, 2, 2. Below the bottom groove 1 is a ring groove 3 in which is disposed our improved oil ring 4. It is the usual practice to relieve the upper part of the piston by providing clearances for the ring lands 5, 6, 7, 8 and 9. The clearances increase toward the top of the piston as it is there that the piston is subjected to the greatest amount of expansion under the heat of operation. In pistons provided with horizontal slots such as $b$ and $b'$ adjacent to the oil land, the bottom land 9, termed the oil ring land, has slightly greater clearance than the other lands so as to provide a reservoir for excess oil from which the oil is drained through the slots.

Our invention contemplates a still further reduction in the diameter of the oil ring land so as to provide a well defined offset entirely around the piston immediately above the horizontal slots $b$ and $b'$, which offset is utilized as a working space for one of the ring component. The ring comprises a horizontal component 10 and a vertical component 11 depending therefrom and formed integral therewith so that our improved ring is L-shaped in cross-section. The outwardly presented surfaces 12 and 13 of the components 10 and 11 are coincident so as to form a continuous working face for contact with the engine cylinder. The oil land 9 is undercut or reduced in diameter just sufficiently to provide clearance 14 behind the ring to allow for the expansion of the piston under the heat of operation. The clearance space 15 between the component 10 and the bottom of groove 3 results from using the groove depth prescribed by the industry and is of standard practice.

The length of the component 11 of the ring 4 is such that the bottom edge $e$ thereof extends downwardly slightly below the edge 16 of land 9. The working face of the ring, comprising the surfaces 12 and 13, is tapered outwardly from the top of the ring to the bottom edge e thereof, and the bottom surface 17 of component 11 inclines upwardly from the edge e. The taper of the working face of the ring and inclination of the bottom surface just described gives the edge e a shearing action and insures that the edge e will effectively remove surplus oil from the cylinder wall and direct it into the slots b, b'. The ring component 10 is provided with a plurality of slots 18 extending entirely around the circumference thereof, and the wall 19 of the piston behind the ring groove 3 is provided with oil drainage ports 20 so that such oil as will get past the edge e will be trapped in the slots 18 and will not be able to exert a pressure between the ring and the cylinder wall, but instead will drain through the slots 18 and ports 20 and flow back into the crankcase.

In Figs. 5 and 6, we show a modification of the invention in which the vertical component 11' of the ring 4' is provided with an outwardly presented channel 21 which will further serve as an oil depository until drainage is effected through the slots 18' in the ring. The channel obviously reduces the area of the ring face and thus increases the unit pressure thereof against the cylinder wall. The bottom surface 17' of the vertical component 11' is slightly curved or concave instead of straight as shown in the main form.

Our improved oil control ring may be used either without an inner spring ring or with an inner spring ring 22 as shown in Figs. 5 and 6. The inner spring ring, as is well known in the art, is preferably of a polygonal shape and is provided with oil drainage recesses 23 in its lower edge so as not to obstruct the ports 20 in the wall 19 of the piston P.

When our improved oil control ring is to be used in new cylinders we prefer that the ring be used without an inner spring ring. However, in old cylinders, which may be out of round or otherwise irregularly worn, the best performance of the oil control ring is obtained when an inner spring ring is associated with it.

During the operation of the piston, when equipped with our improved oil control ring, oil that is sheared from the cylinder wall by the bottom edge e of the ring will be directed toward and flow freely through the slots b, b' rather than be forced past or behind the ring into the upper part of the cylinder. The extending of the piston ring downwardly so as to bring the shearing edge e practically opposite the drainage slots b, b' makes the escape of the oil through said slots the line of least resistance.

Having described our invention, we claim:

1. A piston packing ring comprising a split ring of L-shape cross-section embodying a horizontal component and a vertical component, the outer faces of said components lying in a common surface and forming a continuous working face, said horizontal component having a plurality of circumferentially disposed openings, and the vertical component having a circumferentially disposed groove formed in its outer face.

2. A piston ring for engine pistons comprising a split ring having a horizontal component and a vertical component, the outer surfaces of said component coinciding to form a continuous working face, said face being tapered with its widest diameter toward the bottom of the ring, said horizontal component having circumferentially disposed openings extending therethrough, and said vertical component having a circumferentially disposed groove formed in its outer surface.

CHARLES A. MARIEN.
MELVIN W. MARIEN.